US008634551B2

(12) United States Patent
Yajima

(10) Patent No.: US 8,634,551 B2
(45) Date of Patent: *Jan. 21, 2014

(54) CRYPTOGRAPHIC APPARATUS AND METHOD

(75) Inventor: Jun Yajima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 211 days.

This patent is subject to a terminal disclaimer.

(21) Appl. No.: 12/892,334

(22) Filed: Sep. 28, 2010

(65) Prior Publication Data

US 2011/0075837 A1    Mar. 31, 2011

(30) Foreign Application Priority Data

Sep. 29, 2009  (JP) ................................. 2009-225535

(51) Int. Cl.
*H04L 29/06*    (2006.01)
(52) U.S. Cl.
USPC ........................................................... 380/29
(58) Field of Classification Search
USPC ...................................................... 380/28, 29
See application file for complete search history.

(56) References Cited

U.S. PATENT DOCUMENTS

| 7,212,631 | B2 * | 5/2007 | Averbuj et al. | 380/37 |
| 7,433,469 | B2 * | 10/2008 | Koshy et al. | 380/28 |
| 7,454,016 | B2 * | 11/2008 | Tsunoo | 380/29 |
| 7,688,972 | B2 * | 3/2010 | Suen et al. | 380/28 |
| 7,760,874 | B2 * | 7/2010 | Suen et al. | 380/42 |
| 7,796,752 | B2 * | 9/2010 | Greisas et al. | 380/37 |
| 8,295,479 | B2 * | 10/2012 | Yamamoto et al. | 380/29 |
| 2002/0186841 | A1 * | 12/2002 | Averbuj et al. | 380/44 |
| 2004/0062391 | A1 * | 4/2004 | Tsunoo | 380/42 |
| 2004/0131180 | A1 * | 7/2004 | Mazuz et al. | 380/37 |
| 2004/0156499 | A1 * | 8/2004 | Heo et al. | 380/37 |
| 2005/0047592 | A1 | 3/2005 | Lim | |
| 2005/0163313 | A1 * | 7/2005 | Maitland et al. | 380/28 |
| 2005/0238166 | A1 * | 10/2005 | Koshy et al. | 380/28 |
| 2006/0013387 | A1 * | 1/2006 | Suen et al. | 380/28 |
| 2006/0013388 | A1 * | 1/2006 | Suen et al. | 380/28 |

(Continued)

FOREIGN PATENT DOCUMENTS

JP   2002-116691 A    4/2002
WO   WO-02/098052 A2   12/2002

OTHER PUBLICATIONS

Matsui, Mitsuru "Block Encryption Algorithm MISTY", IEICE Technical Report, vol. 96, No. 167, ISEC96-11, Jul. 22, 1996.

(Continued)

*Primary Examiner* — David García Cervetti
(74) *Attorney, Agent, or Firm* — Fujitsu Patent Center

(57) ABSTRACT

This cryptographic apparatus executes calculations according to an FI function including a first non-linear function S9 and a second non-linear function S7, and includes a ROM recording a first table including, for each input X of 9 bits, a value obtained by exclusively ORing a first value and an first output from the function S9 with respect to the input X, wherein the first value is generated by shifting lower 7 bits in the first output to left by 9 bits, and a second table including, for each input Y of 7 bits, a value obtained by exclusively ORing a second value and the input Y, wherein the second value is generated by shifting a result of an exclusive OR of the input Y and a second output from the function S7 with respect to the input Y to left by 9 bits.

8 Claims, 17 Drawing Sheets

(56) References Cited

U.S. PATENT DOCUMENTS

| | | | |
|---|---|---|---|
| 2006/0013391 A1* | 1/2006 | Suen et al. | 380/201 |
| 2009/0016536 A1* | 1/2009 | Tsunoo | 380/277 |
| 2010/0142702 A1* | 6/2010 | Wolf et al. | 380/29 |
| 2010/0183143 A1* | 7/2010 | Yamamoto et al. | 380/28 |
| 2010/0183144 A1* | 7/2010 | Yamamoto et al. | 380/28 |
| 2010/0246814 A1* | 9/2010 | Olson et al. | 380/29 |
| 2010/0246815 A1* | 9/2010 | Olson et al. | 380/29 |
| 2010/0250964 A1* | 9/2010 | Olson et al. | 713/190 |
| 2010/0278332 A1* | 11/2010 | Yamamoto et al. | 380/28 |
| 2010/0278340 A1* | 11/2010 | Yajima et al. | 380/255 |
| 2010/0329451 A1* | 12/2010 | Mazuz et al. | 380/37 |

OTHER PUBLICATIONS

Nakajima, Junko et al., "Fast Implementations of MISTY1 in Software", SCIS 2001 The 2001 Symposium on Cryptography and Information Security, IEICE, Jan. 23, 2001, pp. 737-742.

Nakajima, Junko et al., "Fast Software Implementations of MISTY (II)", SCIS'98 The 1998 Symposium on Cryptography and Information Security, IEICE, SCIS' 98-9.1.B, Jan. 28, 1998.

Yamamoto, Dai et al., "A Very Compact Hardware Implementation of the MISTY1 Block Cipher," Cryptographic Hardware and Embedded Systems A CHES 2008, LNCS 5154, Aug. 10, 2008, pp. 315-330.

Satoh, Akashi et al., "Small and High-Speed Hardware Architectures for the 3GPP Standard Cipher KASUMI," Information Security, ISC 2002, LNCS 2433, Sep. 30, 2002, pp. 48-62.

Extended European Search Report for the corresponding European Application No. 10150760, mailed on Apr. 7, 2010.

Yamamoto, "A Very Compact Hardware Implementation of the Kasumi Block Cipher," International Federation for Information Processing, 2010, pp. 293-307.

$3^{rd}$ Generation Partnership Project; Technical Specification Group Services and System Aspects; 3G Security; "Specification of the 3GPP Confidentiality and Integrity Algorithms; Document 2: KASUMI Specification," (http://www.3gpp.org/ftp/Specs/archive/35_series/35.202/35202-700.zip), Dec. 1, 1999, pp. 1-24, (Release 7), 3GPP TS 35.202.

USPTO, (OLION) "U.S. Appl. No. 12/656,018 (related)," [CTNF] Non-Final Rejection issued on Mar. 1, 2013.

* cited by examiner

| METHOD | RAM TABLE SIZE | ROM TABLE SIZE | PROCESSING CYCLES (ENCRYPTION + EXPANDED KEY GENERATION) |
|---|---|---|---|
| EMBODIMENT | 0 BYTE | 1280 BYTES | 384 CYCLES |
| CONVENTIONAL IMPLEMENTATION EXAMPLE 1 | 0 BYTE | 2304 BYTES | 400 CYCLES |
| CONVENTIONAL IMPLEMENTATION EXAMPLE 2 | 1024 BYTES | 1280 BYTES | 1600 CYCLES OR MORE |
| CONVENTIONAL IMPLEMENTATION EXAMPLE 3 | 1280 BYTES | 1152 BYTES | 2000 CYCLES OR MORE |
| CONVENTIONAL IMPLEMENTATION EXAMPLE 4 | 0 BYTE | 262144 BYTES | 96 CYCLES |

FIG.17

CRYPTOGRAPHIC APPARATUS AND METHOD

CROSS-REFERENCE TO RELATED APPLICATIONS

This application is based upon and claims the benefit of priority of the prior Japanese Patent Application No. 2009-225535, filed on Sep. 29, 2009, the entire contents of which are incorporated herein by reference.

FIELD

This technique relates to a cryptographic technique utilizing an FI function.

BACKGROUND

As for MISTY1, which is one of common key cryptographic methods (as for the details, see Matsui Mitsuru, "Block Encryption Algorithm MISTY", *IEICE Technical Report*, Vol. 96, No. 167, ISEC96-11, Jul. 22, 1996 or the like.), various implementation methods are considered.

FIG. 1 depicts one example of a configuration for the common key cryptographic method such as MISTY1. The common key cryptographic method relating to MISTY1 includes a round processing and an expanded key generation processing. As depicted in FIG. 1, in the expanded key generation processing, plural expanded keys (in FIG. 1, an expanded keys 0, 1, . . . N) are generated from an input secret key. The generated expanded keys are used in the encryption processing (also called the "round processing"). In the encryption processing, text data (i.e. data to be encrypted) is divided into blocks by a predetermined bit length (i.e. block length), and the round processing is carried out for each of the generated blocks to generate the encrypted text. At the decryption, an inverse calculation of the encryption processing is carried out.

The common key cryptographic method MISTY1 is an algorithm whose length of the secret key is 128 bits and whose block length of the encryption is 64 bits.

FIG. 2 depicts a configuration of the round processor in MISTY1. As depicted in FIG. 2, in the round processor to convert text data P (64 bits) into encrypted text data C (64 bits), an FL function is executed 10 times and an FO function is executed 8 times.

The i-th FO function has a configuration as depicted in FIG. 3. KOi1, KOi2, KOi3 and KOi4 (which are respectively 16 bits) are inputted into the FO function. These are four of K1 to K8, which are generated by dividing, by 16 bits, the 128-bit secret key. Which of K1 to K8 is selected is determined according to the algorithm specification based on the round value i (i.e. a value "i" of FOi).

In addition, in the i-th FO function, the FI function is executed three times. Then, KIi1 is inputted to an FIi1 function, KIi2 is inputted into an FIi2 function, and KIi3 in inputted into an Fi3 function. KIi1 to KIi3 are 16-bit values and three of K'1 to K'8, which are generated by an expanded key generation algorithm. Which of K'1 to K'8 is selected is determined according to the algorithm specification based on the round value i (i.e. a value "i" of FOi).

FIG. 4 depicts a configuration of the j-th FI function in the i-th FO function. In the FI function, upper 9 bits in the 16-bit input are inputted to a non-linear function S9 (a function to scramble the input data according to a predetermined algorithm (repeat of the logical computation) and output the scrambled data), and an output of the function S9 and a value, in which two "0" are added (denoted "0-extension") as upper 2 bits to lower 7 bits in the 16-bit input, are exclusively ORed to generate data "a". In addition, the lower 7 bits in the 16-bit input are inputted to a non-linear function S7 (a function to scramble the input data according to a predetermined algorithm (repeat of the logical computation) and output the scrambled data), and an output of the function S7 and a value, in which upper 2 bits in the data "a" is removed (denoted "truncate"), are exclusively ORed to generate data "b". Furthermore, the data "b" and KIijL (i.e. upper 7 bits of KIij) are exclusively ORed to generate data "c". Moreover, the data "a" and KIijR (i.e. lower 9 bits of KIij) are exclusively ORed to generate data "d". The data "d" is inputted into the non-linear function S9 again, and further the output of the function S9 and a value, in which two "0" are added as upper 2 bits to the data "c" are exclusively ORed to generate data "e". Then, finally, when the data "c" is arranged in the upper 7 bits, the data "e" is arranged in the lower 9 bits and they are concatenated, 16-bit output is obtained.

Next, FIG. 5 depicts a configuration of an expanded key generator of MISTY1. In the expanded key generator, 128-bit secret key is divided by 16 bits to generate K1 to K8 from the most significant bit. As depicted in FIG. 5, the expanded key K'8 is generated by the FI function using K8 as an input and K1 as KIij. The expanded key K'7 is generated by the FI function using K7 as an input and K8 as KIij. The expanded key K'6 is generated by the FI function using K6 as an input and K7 as KIij. The expanded key K'5 is generated by the FI function using K5 as an input and K6 as KIij. The expanded key K'4 is generated by the FI function using K4 as an input and K5 as KIij. The expanded key K'3 is generated by the FI function using K3 as an input and K4 as KIij. The expanded key K'2 is generated by the FI function using K2 as an input and K3 as KIij. The expanded key K'1 is generated by the FI function using K1 as an input and K2 as KIij.

Thus, when MISTY1 is implemented by software or hardware, the implementation method of the FI function is one of problems. This is because the FI function is used in both of the round processor and expanded key generator, and if it is possible to efficiently execute the FI function, the performance of the MISTY1 is largely improved.

Some conventional implementation methods of the FI function are described in Japanese Patent No. 3917357.

FIGS. 6 and 7 depict a first implementation example disclosed in the aforementioned Japanese patent. In this implementation example, after the algorithm in FIG. 4 is equivalently converted into an algorithm as depicted in FIG. 6, a processing 1001 of the non-linear function S9, a processing 1003 of the non-linear function S7 and a processing including the non-linear function S9 are tabulated. However, the processing 1001 is different from the processing 1005. As a result, as depicted in FIG. 7, the processing 1001 is replaced with a table T1, the processing 1003 is replaced with a table T4 and the processing 1005 is replaced with a table T5. These tables are stored in a Read Only Memory (ROM), and are referenced if necessary.

Incidentally, as an example, as for the FI function using K'1, KIijR and KIijL' are generated as follows:

KIijR=K'1 & 0x1FF
tmpk1=K'1 & 0xFE00
tmpk2=KIijR & 0x7F
tmpk3=tmpk2<<9
tmpk4=tmpk3+tmpk1
tmpk5=tmpk4>>9
KIijL'=tmpk5+tmpk4

The tables T1, T4 and T5 are defined as follows:

Incidentally, X represents an input. In addition, a table entry is generated for all possible X values.

$$T1(X)=S9(X)$$

$$T5(X)=((X\&0x7F)<<9)+(X\&0x7F)+S9(X)$$

$$T4(X)=(S7(X)<<9)+S7(X)$$

"<<9" means shifting to left, ">>9" means shifting to right, and "X&0x7F" means extracting lower 7 bits of X.

In such an implementation method, the size of the table T1 is 1 KB, the size of the table T4 is 1 KB, the size of the table T5 is 256B, and total 2304B in the ROM are used. However, no Random Access Memory (RAM) is used.

In addition, in this implementation example, 9 cycles are required for one FI function, and 24 FI functions are used. Therefore, total 216 cycles are required for the entire round processing.

On the other hand, in the expanded key generation processing, 7 cycles for a preprocessing of data corresponding to KIijR and KIijL', 9 cycles for the FI function and 7 cycles for a processing to generate KIijR and KIijL' for the round processing for K'i are required for the respective 8 FI functions. Therefore, for the entire expanded key generation processing, 184 cycles (=(7+9+7)*8) are required.

Here, the processing time for the round processing is calculated as "(the number of cycles for one FI function)*8". Incidentally, cycles for the FL functions other than the FI functions and exclusive OR (XOR) in the FO function and the expanded key are required for the round processing. However, because the number of required cycles is less and the latency is small, they are excluded from the estimate of the processing time.

Furthermore, FIGS. 8 and 9 depict a second implementation example disclosed in the aforementioned patent publication. As depicted in FIG. 8, in the first implementation example depicted in FIG. 7, the exclusive OR with KIijR and a portion 1101 of the table T5 are tabulated. Namely, as depicted in FIG. 9, a table T5j is introduced.

However, KIijR is data generated based on the expanded K'i, and when the user inputs the secret key, the value is identified for the first time. Therefore, the table T5j cannot be calculated before the user inputs the secret key, and the table T5j is generated after the input of the secret key. Namely, the table T5j cannot be held on ROM, and RAM is used.

The tables T1 and T4 are the same as the aforementioned tables, and are stored in ROM after calculation is carried out for all possible values of X in advance. On the other hand, the table T5j is prepared according to a following expression. However, after the user inputs the secret key and calculation is carried out for all possible input patterns, the table T5j is stored into RAM.

$$T5j(X)=(((X+KIijR)\&0x7F)<<9)+((X+KIijR)\&0x7F)+S9(X)$$

In such an implementation method, the size of the table T1 is 1 KB, the size of the table T4 is 256B, and ROM whose size is total 1280B is used. In addition, because the table T5j is held on RAM, the size of RAM is 1 KB.

In this implementation method, 8 cycles are required for one FI function, and because 24 FI functions exist, 192 cycles are required for the entire round processing.

On the other hand, in the expanded key generation processing, the generation of the table T5j is carried simultaneously. 1536 cycles or more are required for the generation of this table, and when the cycles required for other portion of the expanded key generation processing are added, 1600 cycles or more are required for the entire processing.

Furthermore, FIGS. 10 and 11 depict a third implementation example disclosed in the aforementioned patent publication. As described in FIG. 10, in the second implementation example depicted in FIG. 9, the exclusive OR with KIijL' and a portion 1201 of the table T4 are tabulated. Namely, as depicted in FIG. 11, a table T4j is introduced.

However, KIijL' is data generated based on the expanded key K'i, and the value of KIijL' is identified after the user inputs the secret key into the cryptographic apparatus. Therefore, it is impossible to calculate the table T4j before the user inputs the secret key, and the table T4j is prepared after the input of the secret key. Namely, the table T4j cannot be held on ROM, and is held on RAM.

The table T1 is the same as the aforementioned table, and all of the possible values are calculated in advance and recorded onto the ROM. As described above, the table T5j is held on RAM. Furthermore, data stored on the table T4j is calculated using a following expression. However, after the user inputs the secret key and values are calculated for all possible input patterns, the table T4j is held on RAM.

$$T4j(X)=(S7(X)<<9)+S7(X)+KIijL$$

In such an implementation method, the size of the table T1 is 1 KB, the size of the table T4j is at least 128B for the preprocessing, and the total size of ROM is 1152B or more. On the other hand, the tables T4j and T5j are held on RAM, and the size is 1280B.

Furthermore, in this implementation example, 7 cycles is required for one FI function, and 24 FI functions exist. Therefore, 168 cycles are required for the round processing.

On the other hand, in the expanded key generation processing, the generation of the tables T4j and T5j is simultaneously carried out. 1920 cycles or more are required for the generation of this table, and when the other expanded key generation processing is included, 2000 cycles or more are required.

Furthermore, a paper (Nakajima Junko and Matsui Mitsuru, "Fast Implementation of MISTY in Software (II)", SCIS98-9.1B) discloses another implementation method. This method is explained by using FIG. 12. In this implementation method, the FI function depicted in FIG. 4 is equivalently converted into a form depicted in FIG. 12. In the example of FIG. 12, an upper portion including the non-linear functions S9 and S7 is converted into a table T7, and a lower portion other than the exclusive OR with KIij, which includes the non-linear function S9, is converted into a table T8.

In such an implementation example, the size of the table T7 is 131072B, the size of the table T8 is 131072B and the total table size is 262144B. Incidentally, RAM is not used.

In such an implementation example, 3 cycles are required for one FI function, and because 24 FI functions exist, 72 cycles are required for the round processing. Because KIij is used as it is, 24 cycles are required for the expanded key generation processing, due to 8 FI functions.

Because MISTY1 is implemented into an embedded device, it is desired that the consumed capacity of RAM is less, the size of ROM is less and the processing speed is high. Especially, it is desired that the consumed capacity of RAM is as less as possible, and a method storing a calculation table prepared in advance into RAM is not suitable for the embedded device environment. In addition, it is desired that the size of ROM is as less as possible. However, when the table stored in ROM is reduced, the processing speed is rapidly lowered and the processing speed becomes insufficient.

SUMMARY

As an aspect of this technique, this is a cryptographic apparatus to carry out calculations according to an FI function including a first non-linear function S9 and a second non-linear function S7. Then, this cryptographic apparatus includes a read-only memory recording (A-1) a first conversion table including, for each first input X of 9*n bits (n is an integer equal to or larger than 1), a value obtained by exclusively ORing a first value and an first output from the first non-linear function S9 with respect to the first input X, wherein the first value is generated by shifting lower 7*n bits in the first output to left by 9*n bits; and (A-2) a second conversion table including, for each second input Y of 7*n bits, a value obtained by exclusively ORing a second value and the second input Y, wherein the second value is generated by shifting a result of exclusive OR of the second input Y and a second output from the second non-linear function S7 with respect to the second input Y to left by 9*n bits; and (B) an FI function calculation unit to carry out one calculation of an FI function by using, twice, the first conversion table recorded on the read-only memory and using, once, the second conversion table recorded on the read-only memory.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 17 is a diagram depicting a comparison table of the effects;

DESCRIPTION OF EMBODIMENTS

Figure 1:
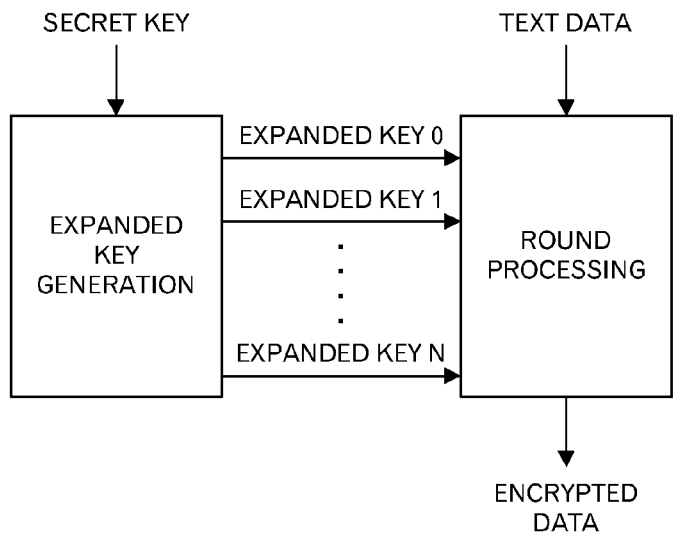
FIG. 1 is a diagram depicting a configuration example of a common key cryptographic method MISTY1.
Figure 3:
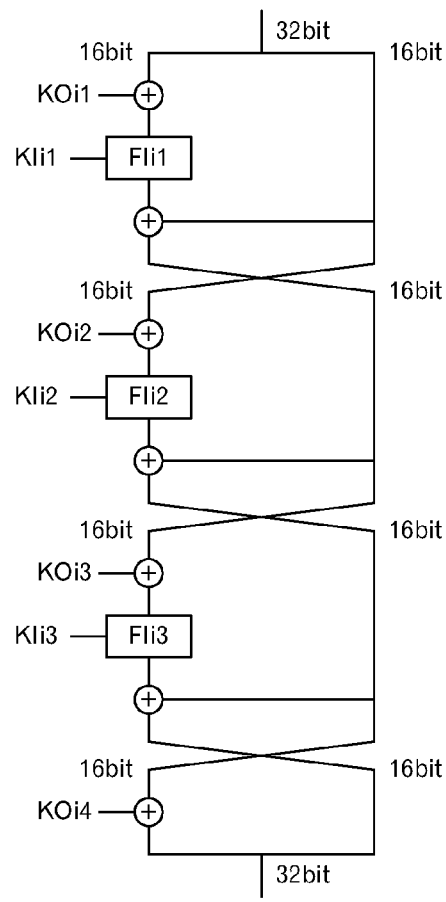
FIG. 3 is a diagram depicting an algorithm of an FO function.
Figure 2:
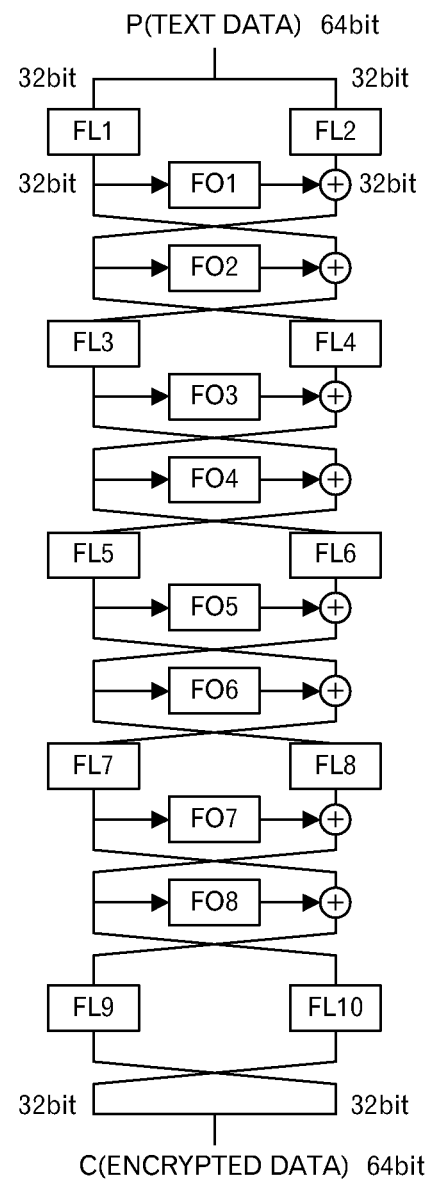
FIG. 2 is a diagram depicting an algorithm of a round processing.
Figure 4:
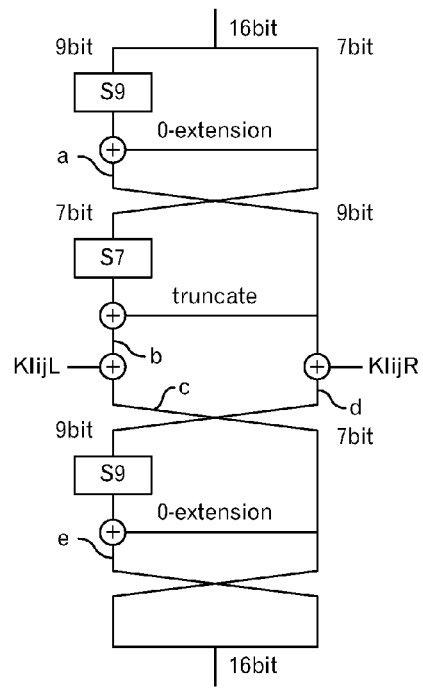
FIG. 4 is a diagram depicting an algorithm of an FI function.
Figure 5:
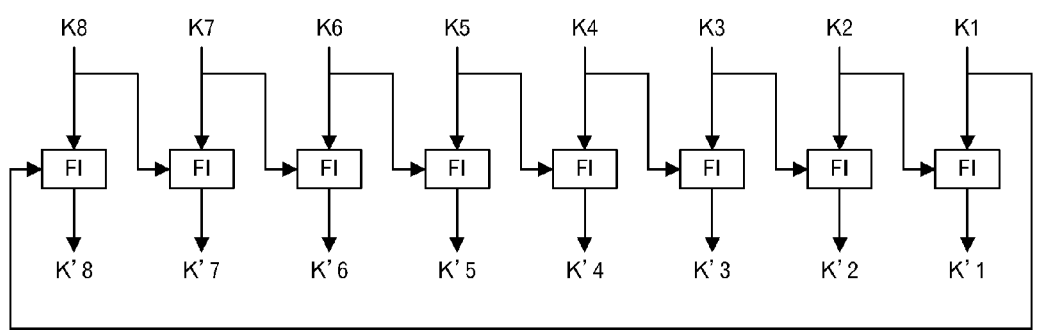
FIG. 5 is a diagram depicting an algorithm of an expanded key generation processing.
Figure 6:
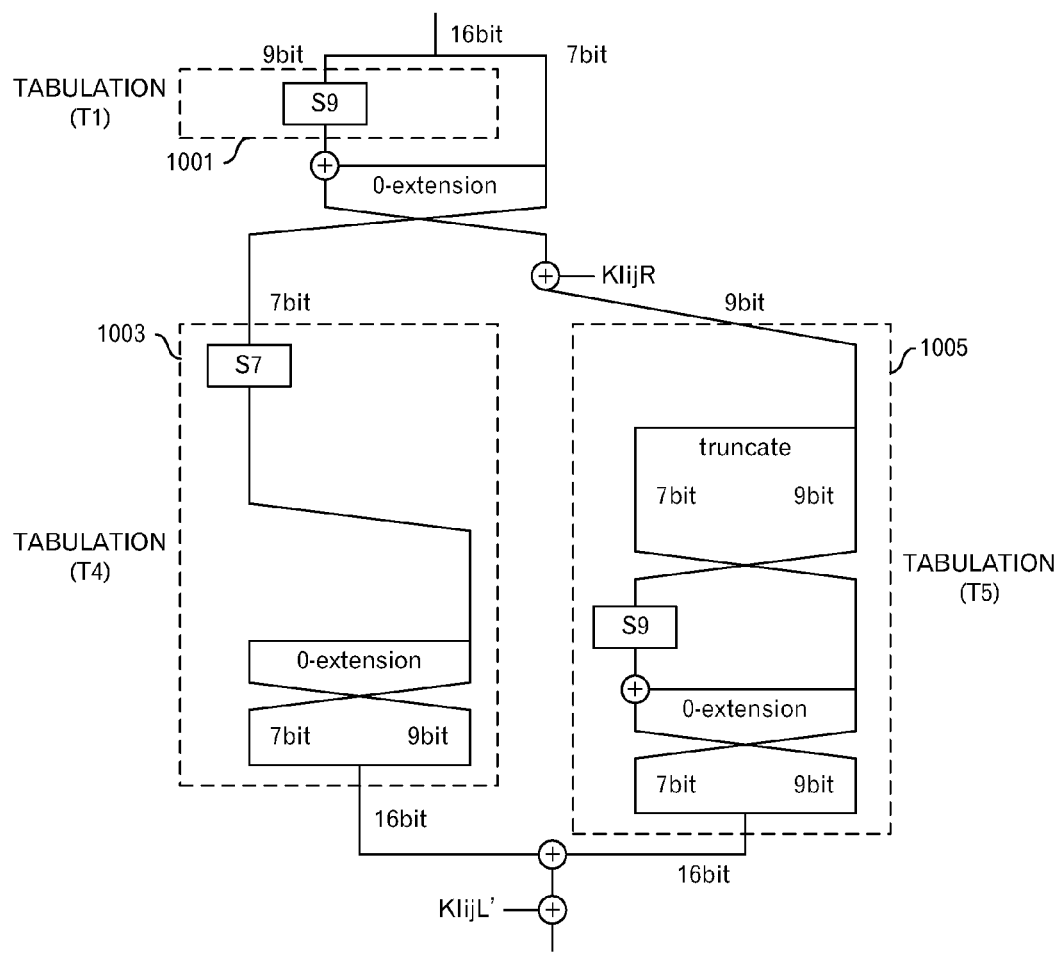
FIG. 6 is a diagram depicting an equivalent conversion carried out in a first conventional implementation example.
Figure 7:
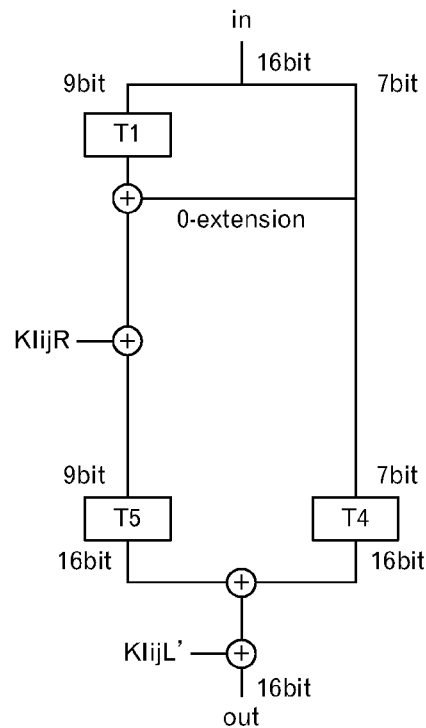
FIG. 7 is a diagram depicting an algorithm of the first conventional implementation example.
Figure 8:
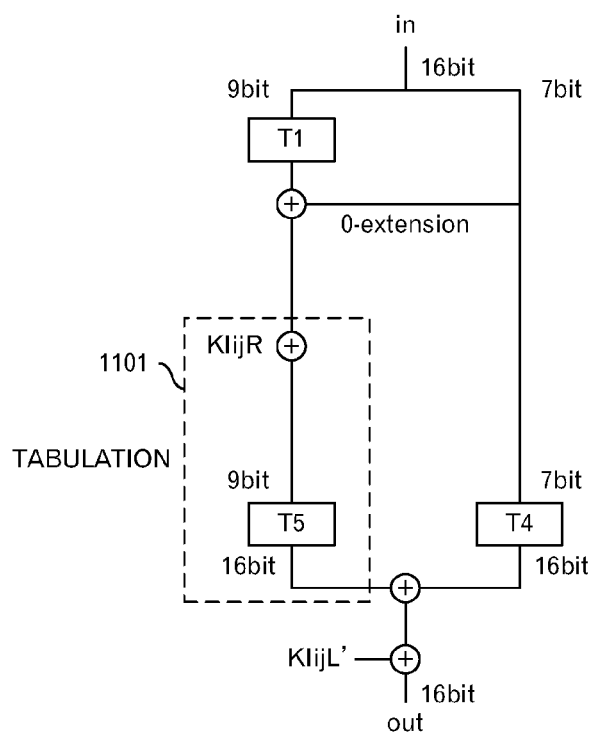
FIG. 8 is a diagram depicting an equivalent conversion carried out in a second conventional implementation example.
Figure 9:
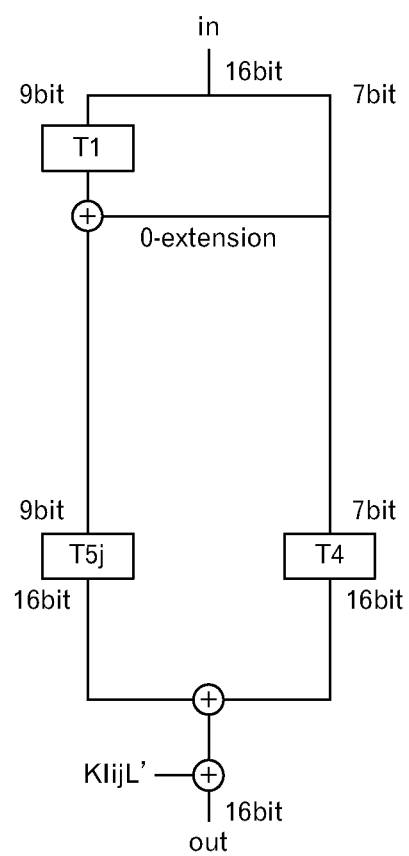
FIG. 9 is a diagram depicting an algorithm of the second conventional implementation example.
Figure 10:
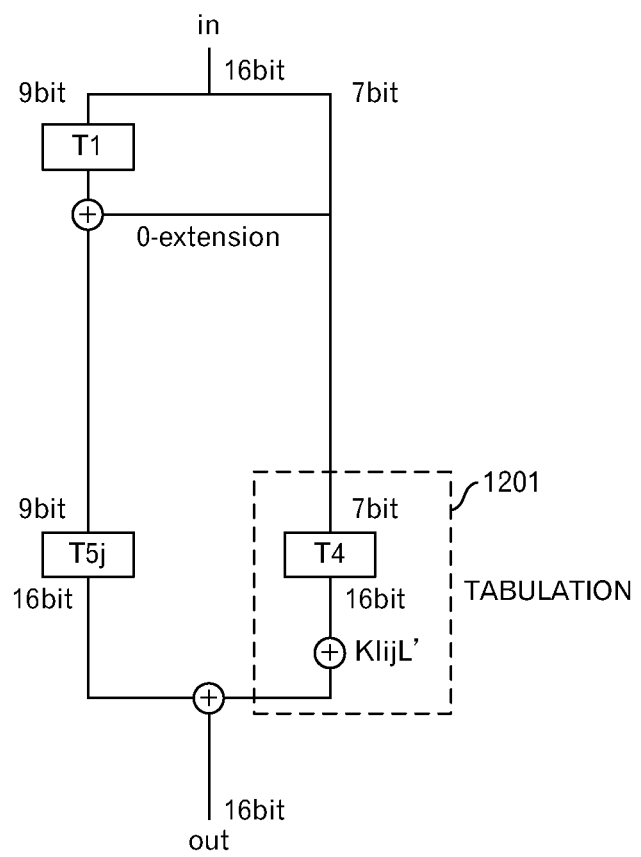
FIG. 10 is a diagram depicting an equivalent conversion carried out in a third conventional implementation example.
Figure 11:
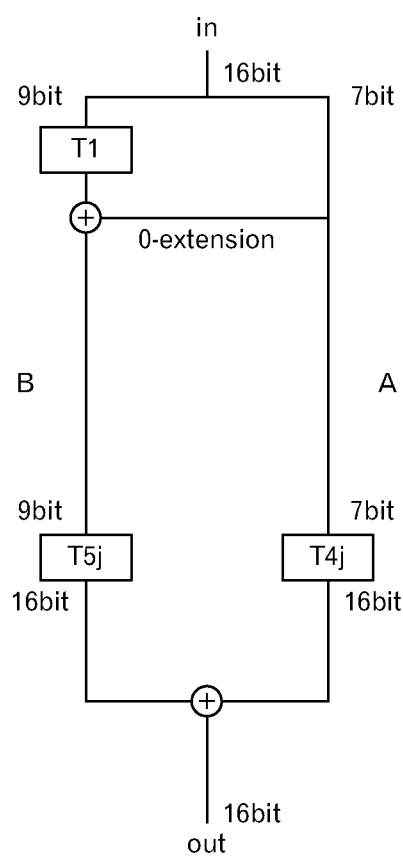
FIG. 11 is a diagram depicting an algorithm of the third conventional implementation example.
Figure 12:
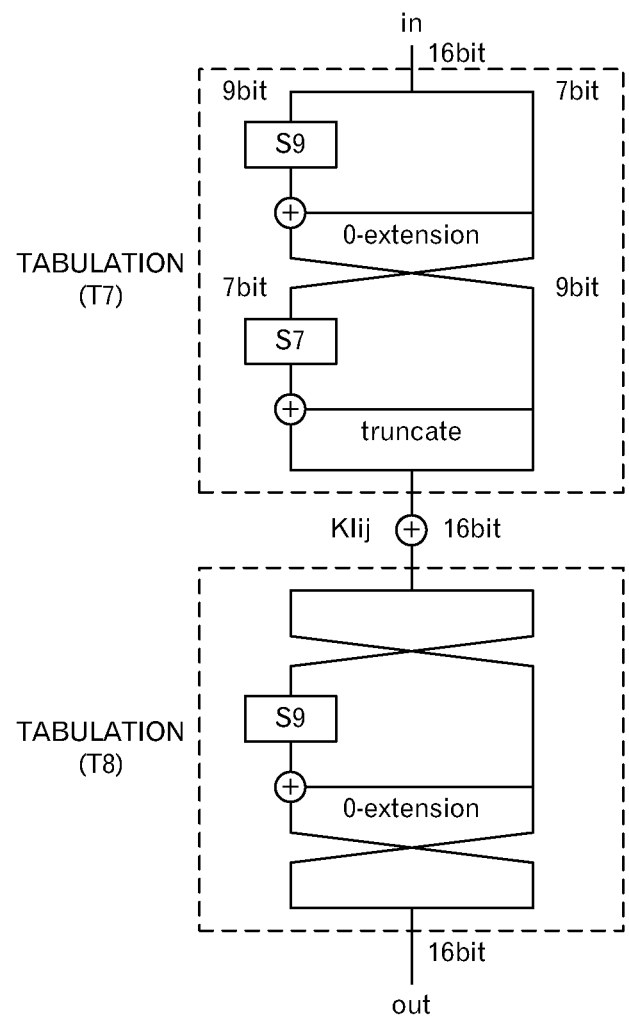
FIG. 12 is a diagram depicting an equivalent conversion carried out in a fourth conventional implementation example.
Figure 13:
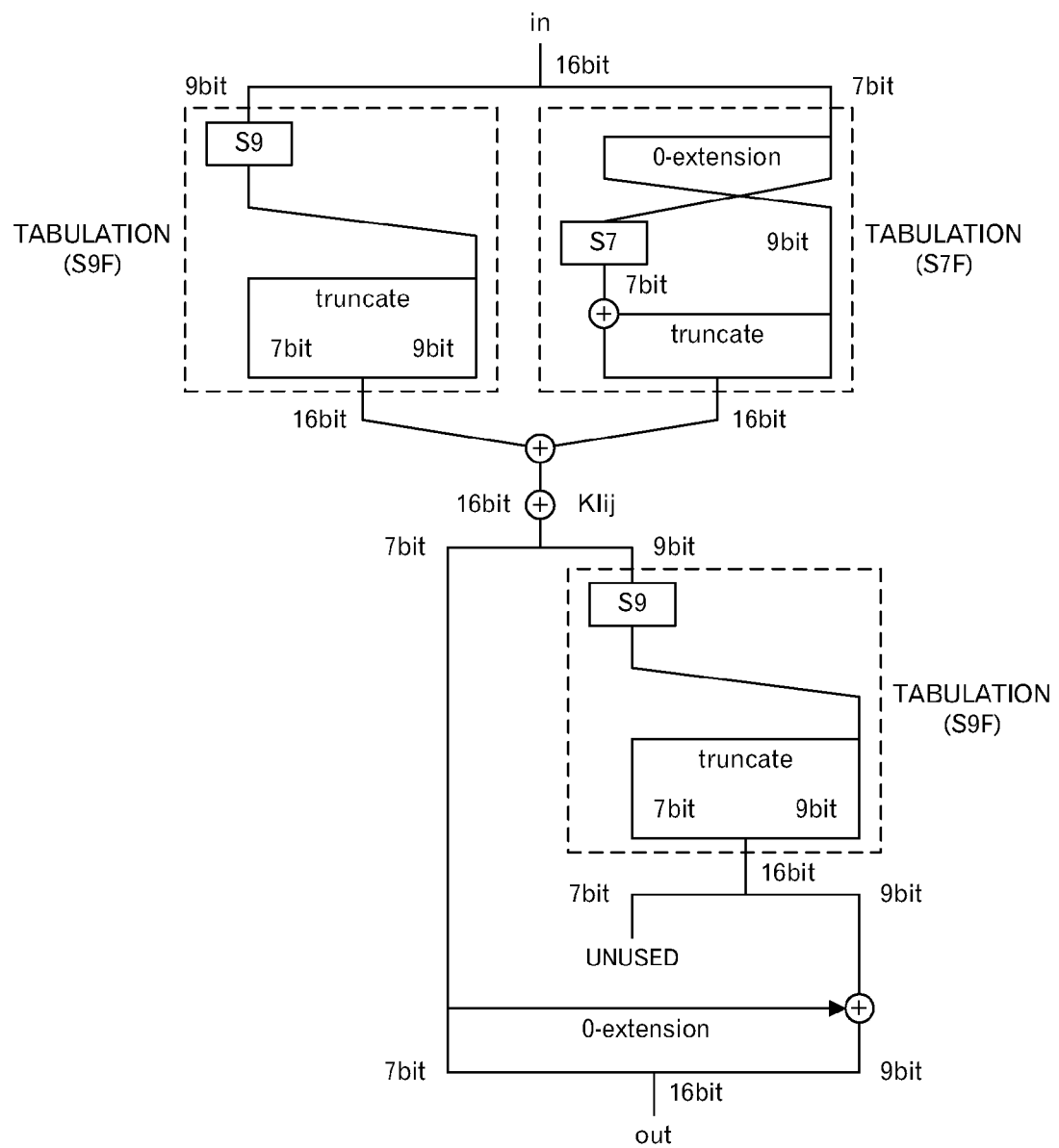
FIG. 13 is a diagram to explain an equivalent conversion of an FI algorithm in this embodiment of this technique.

In this embodiment of this technique, the algorithm of the FI function depicted in FIG. 4 is equivalently converted into a form as depicted in FIG. 13. Incidentally, a 16-bit input is used in the following example. However, this example can be expanded to a device handling a value having a bit length of an integral multiple of 16 bits. At that time, 9 bits and 7 bits are also multiplied by the integer.

In the algorithm of FIG. 13, the upper 9 bits in the 16-bit input Z are inputted to the non-linear function S9, and first data is generated by arranging lower 7 bits in the 9-bit output of the non-linear function S9 in upper bit position, arranging the 9-bit output of the non-linear function S9 in lower bit position as they are and concatenating them. Such processing contents are converted into a first table S9F.

In addition, the lower 7 bits of the 16-bit input Z are inputted into the non-linear function S7, and second data is generated by calculating the exclusive OR of the output of the non-linear function S7 and the lower 7 bits of the input Z. Then, third data is generated by arranging the second data in upper bit position, arranging a 9-bit value, which is generated by additionally arranging two "0" in upper bit position of the lower 7 bits in the input Z, in lower bit position, and concatenating them. Such processing contents are converted into a second table S7F.

Furthermore, fourth data is generated by calculating the exclusive OR of KIij and a result of the exclusive OR of the first and third data.

Then, the lower 9 bit in the fourth data is inputted to the non-linear function S9, and fifth data is generated by arranging the lower 7 bits in the 9-bit output of the non-linear function S9 in upper bit position, arranging the 9-bit output of the non-linear function S9 in lower bit position as they are, and concatenating them. This portion is the same as the original processing of the first table S9F. Therefore, this portion can be replaced with the reference to the first table S9F.

Then, an output R is generated by arranging, in lower bit position, a result of the exclusive OR of lower 9 bits in the fifth data and a generated value, arranging the upper 7 bits in the fourth data in upper bit position, and concatenating them. The generated value is generated by adding two "0" to the leftmost position of the 7 bits in the fourth data.

In the algorithm after such an equivalent conversion, the table S9F is a table in which following values S9F(X) are stored for all possible inputs X. Similarly, the table S7F is a table in which following values S7F(Y) are stored for all possible input Y.

$$S9F(X)=((S9(X)\&0x7F)<<9)+S9(X)$$

$$S7F(Y)=(S7(Y)+Y)<<9)+Y$$

As described above, "&0x7F" representing a processing to extract the lower 7 bits, and "<<9" represents shifting to left by 9 bits. Incidentally "+" represents the exclusive OR. Then, when A is 7 bits and B is 9 bits, (A<<9)+B means a processing to arrange A in upper 7-bit position and arranging B in lower 9-bit position.

Therefore, as described above, the table S9F(X) is a table in which, after the lower 7 bits in the output of the non-linear function S9 with respect to the 9-bit input X are extracted, the value of the exclusive OR of a value generated by shifting the extracted lower 7 bits to left by 9 bits and the output of the non-linear function S9 is registered in association with each of X.

Similarly, the table S7F(Y) is a table in which, after shifting a result obtained by exclusively ORing the output of the non-linear function S7 with respect to the 7-bit input Y and the input Y to left by 9 bits, a value obtained by exclusively ORing the shifted result and the input Y is registered in association with each Y.

By adopting such tables, no table is stored in RAM.

Figure 14:
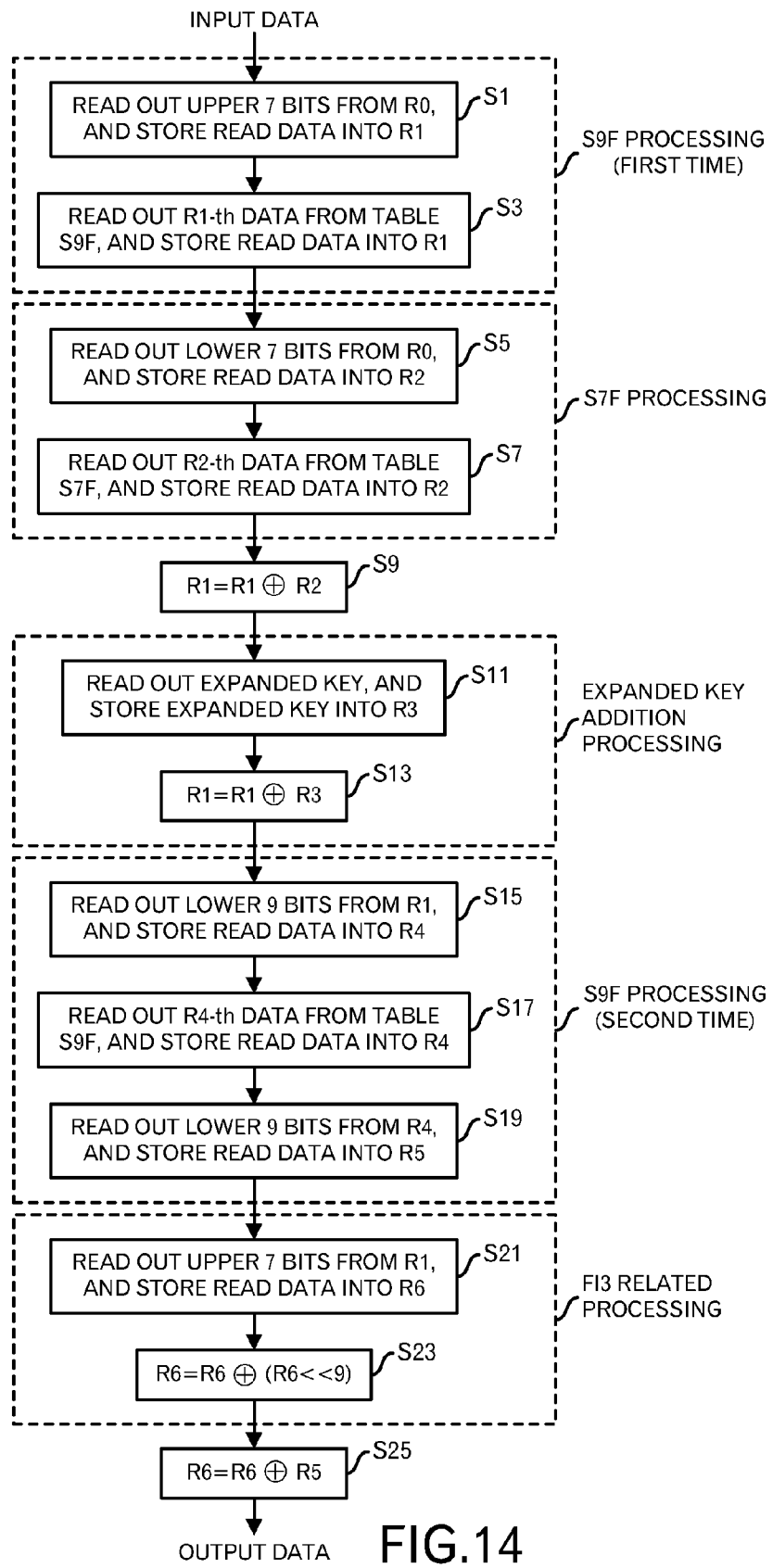
FIG. 14 is a diagram to explain processing contents after the equivalent conversion.

Next, a processing of the FI function using such tables is explained by using FIG. 14.

A processor (i.e. a Central Processing Unit (CPU)) in a cryptographic apparatus reads out upper 9 bits from a register R0 storing the input data, and stores the upper 9 bits into a register R1 (step S1). Then, the processor reads out data at an address (e.g. data in order of R1 value) corresponding to a value stored in the register R1 from the table S9F, and stores the read data into the register R1 (step S3). Incidentally, the steps S1 and S3 are called a "first S9F processing".

On the other hand, the processor reads out the lower 7 bits from the register R0, and stores the read lower 7 bits into the register R2 (step S5). Furthermore, the processor reads out data at an address (e.g. data in order of the R2 value) corresponding to the value stored in the register R2 from the table S7F, and stores the read data into the register R2 (step S7). Incidentally, a set of the steps S5 and S7 is called an "S7F processing".

The orders of the first S9F processing and S7F processing can be exchanged, and if the processor has plural cores, those processing may be executed in parallel.

Then, the processor calculates the exclusive OR of the data in the register R1 and the data in the register R2, and stores a result of the exclusive OR into the register R1 (step S9).

In addition, the processor reads out an expanded key KIij and stores the expanded key KIij into the register R3 (step S11). Then, the processor calculates the exclusive OR of the data in the register R1 and the data in the register R3, and stores a result of the exclusive OR into the register R1 (step S13). A set of the steps S11 and S13 is an expanded key addition processing.

Because the order of the exclusive OR does not matter, it is possible to exchange the order of the step S9 and the expanded key addition processing.

Furthermore, the processor reads out the lower 9 bits from the register R1, and stores the read 9 bits into the register R4 (step S15). In addition, the processor reads out data at an address (e.g. data in order of the R4 value) corresponding to the value stored in the register R4 from the table S9F, and stores the read data into the register R4 (step S17). Furthermore, the processor reads out the lower 9 bits from the register R4, and stores the read 9 bits into the register R5 (step S19). A set of the steps S15 to S19 is called a "second S9F processing".

In addition, the processor reads out the upper 7 bits from the register R1, and stores the read 7 bits into the register R6 (step S21). Then, the processor calculates the exclusive OR of the value in the register R6 and a value obtained by shifting the value in the register R6 to left by 9 bits, and stores a result of the exclusive OR into the register R6 (step S23). A set of the steps S21 and S23 is called an "FI3-related processing".

It is possible to exchange the orders of the second S9F processing and the FI3-related processing, and if the processor has plural cores, they may be executed in parallel.

Then, finally, the processor calculates the exclusive OR of the value in the register R6 and the value in the register R5, and stores a result of the exclusive OR into the register R6 (step S25).

Thus, output data of the FI function is stored in the register R6.

Figure 15:
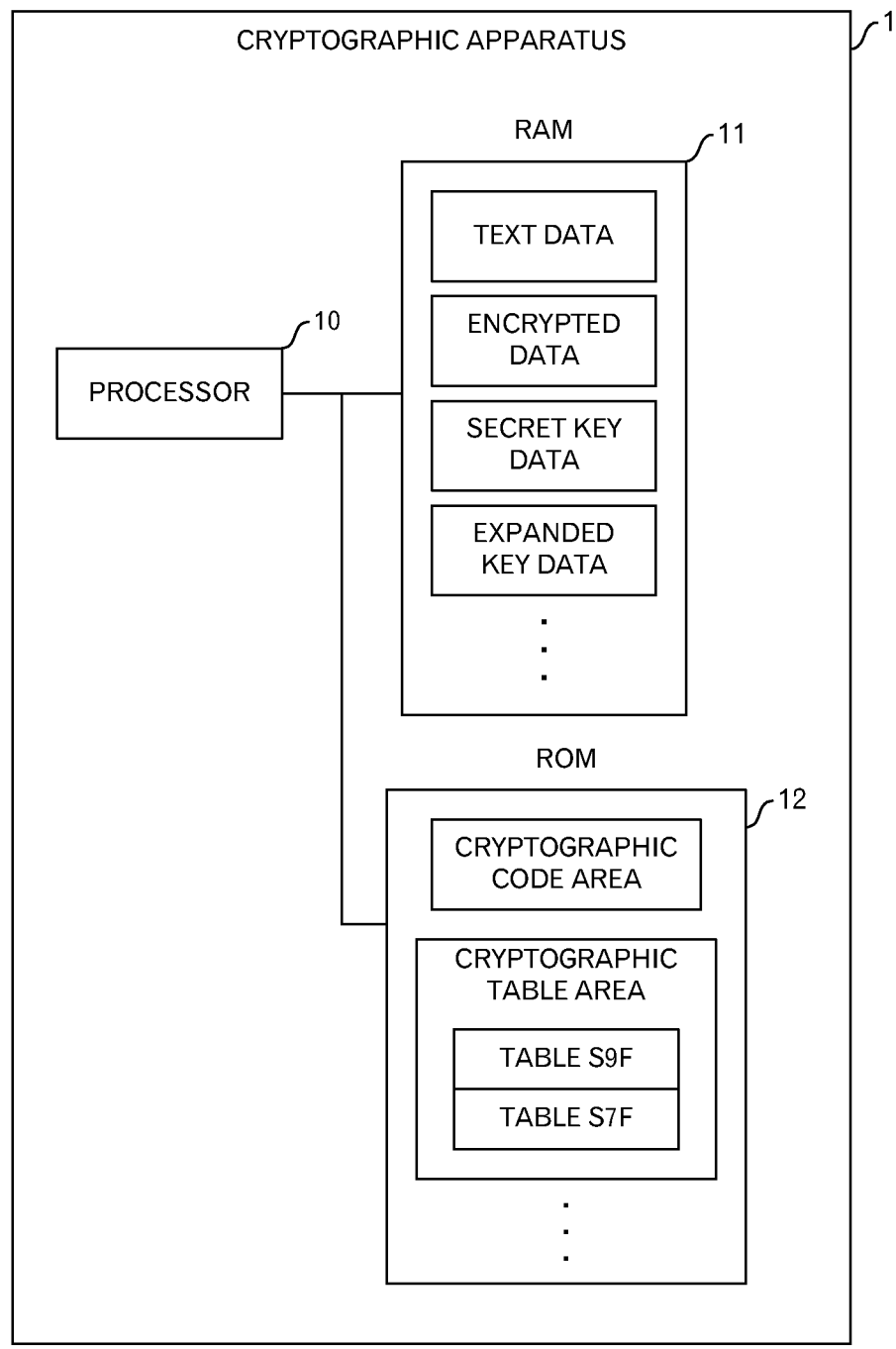
FIG. 15 is a diagram depicting a configuration when a processor carries out a processing.

Actually, when implementing a device by using the tables S9F and S7F and a program for causing a processor to execute the processing depicted in FIG. 14, a configuration depicted in FIG. 15 is adopted, for example.

A cryptographic device 1 in FIG. 15 has a processor 10, a RAM 11 and a ROM 12. The processor 10 is connected via a bus with the RAM 11 and ROM 12. Text data, encrypted data, secret key data and expanded key data are stored in the RAM 11. However, the tables for the FI function are not stored in the RAM 11. In addition, the ROM 12 includes a cryptographic code area storing cryptographic codes for causing the processor 10 to execute a cryptographic processing such as MISTY1 including a processing depicted in FIG. 14, and a cryptographic table storage area storing cryptographic tables including the aforementioned tables S9F and S7F.

Incidentally, the processor 10 and ROM 12 may be integrated into one semiconductor chip. Similarly, the processor 10, ROM 12 and RAM 11 may be integrated into one semiconductor chip.

Figure 16:
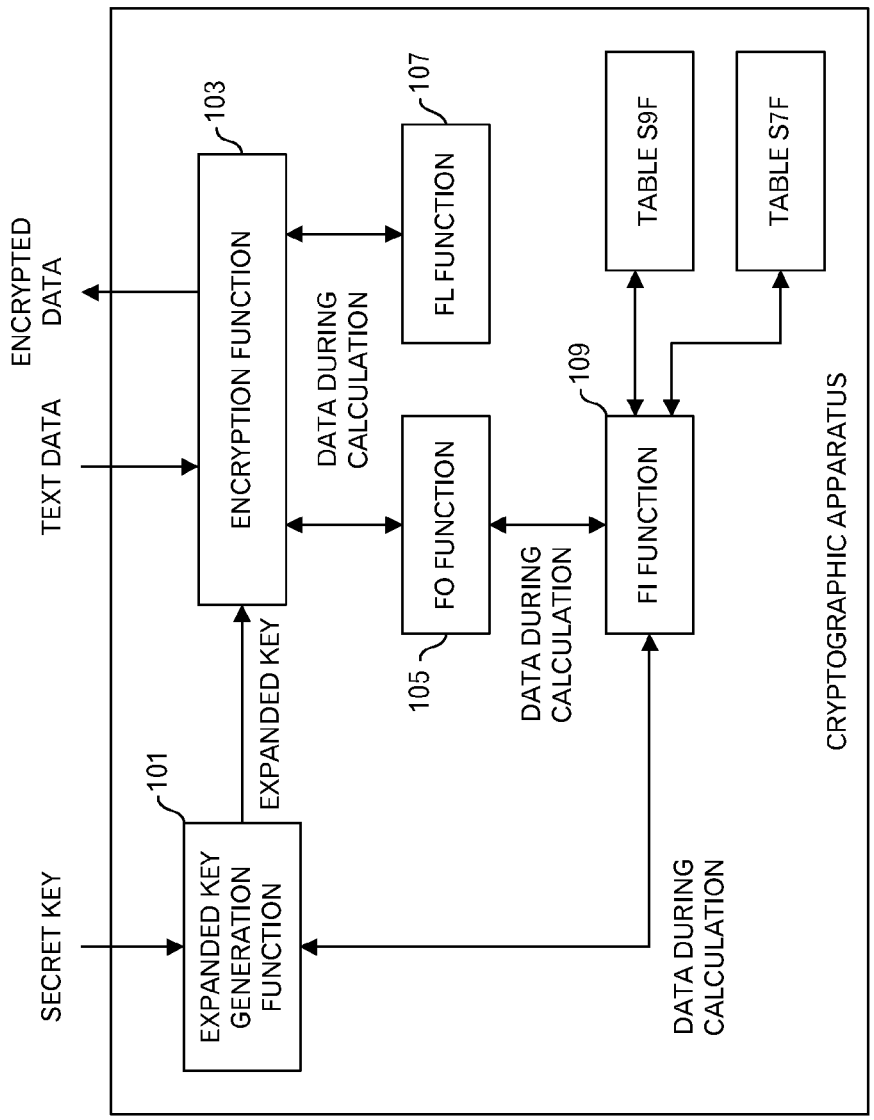
FIG. 16 is a functional block diagram of a cryptographic apparatus.

When implementing MISTY1 by the cryptographic device 1 depicted in FIG. 15, functions as depicted in FIG. 16 are realized. Namely, an expanded key generation function 101 to generate expanded keys from the secret key, an encryption function 103 to carry out the round processing for encrypting text data into encrypted data by using the expanded keys, FO function 105 and FL function 107 to return calculation results when called from the encryption function 103 and an FI function 109 to return calculation results when called from the expanded key generation function 101 and FO function 105 are realized. The FI function 109 carries out calculations by using aforementioned tables S9F and S7F.

When creating the program for causing the processor to execute the processing as depicted in FIG. 14, 12 cycles are consumed for one FI functions. Because 24 FI functions exist in MISTY1, 288 cycles are consumed for the entire round processing.

On the other hand, although the FI function is also used in the expanded key generation processing, no pre-processing is required because KIij is used as it is. Therefore, 96 cycles (=12 cycles*8) are consumed for the entire expanded key generation processing.

In addition, as for the size of ROM, the table S9F uses 1 KB, and the table S7F uses 256B. Therefore, total 1280B are used. Of course, RAM is not used for a pre-calculation table for the FI function.

FIG. 17 depicts an effect comparison table with the conventional arts. If a condition that the size of the table to be stored in RAM is zero is adopted, the size of the embodiment's table to be recorded in ROM is the minimum. Incidentally, the processing cycles of this embodiment for (encryption processing (i.e. round processing)+expanded key generation processing) are lesser than the conventional arts, whereby the processing speed is improved.

Figure 18:
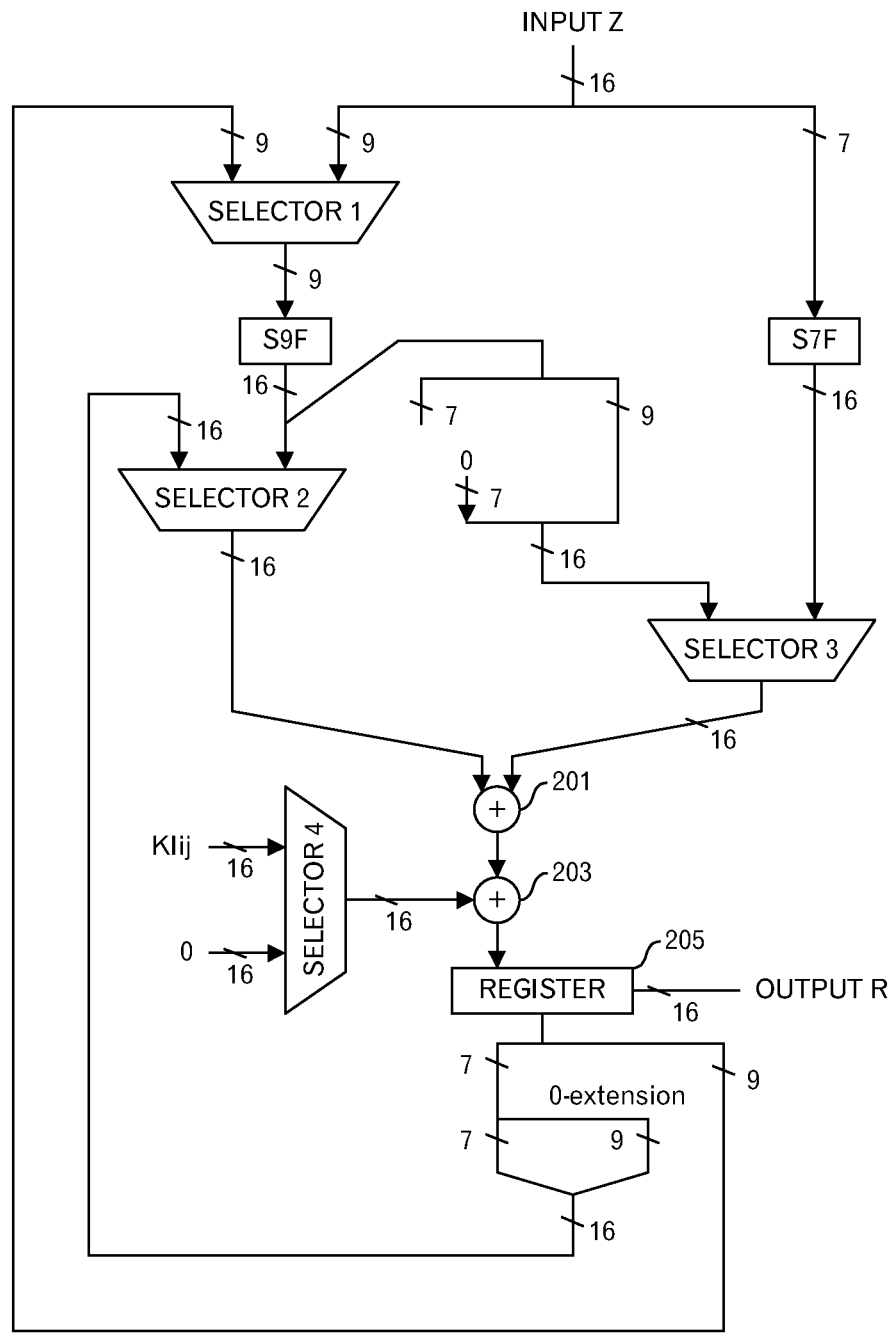
FIG. 18 is a diagram depicting an example when the FI function is implemented by the hardware.

Incidentally, for example, the FI function 109 and the tables S9F and S7F may be implemented by the hardware. FIG. 18 depicts an example of the hardware implementation.

The FI function calculation unit by the hardware has selectors 1 to 4, exclusive OR calculation units 201 and 203 and a register 205.

The upper 9 bits in the input Z and the lower 9 bits in the value stored in the register 205 are inputted to the selector 1, and any one of the inputs are selected. In addition, corresponding data is read out with the output of the selector 1 from the table S9F, and the output of the table S9F is inputted to the selector 2.

In addition, corresponding data is read out with the lower 7 bits in the input Z from the table S7F, and the output of the table S7F is inputted to the selector 3.

Furthermore, the output of the table S9F and data generated by arranging 9-bit data in lower bit position, arranging the upper 7 bits in the value stored in the register 205 in upper bit position and concatenating them, are inputted to the selector 2. The 9-bit data is generated by adding two "0" to the leftmost position of the upper 7 bits in the value stored in the register 205.

In addition, the output of the table S7F and a value generated by adding 7 "0" in the leftmost position of the lower 9 bits in the output of the table S9F and concatenating them are inputted to the selector 3.

Furthermore, an inputted expanded key and 16-bit "0" are inputted into the selector 4.

The outputs of the selectors 2 and 3 are inputted to the exclusive OR calculation unit 201 and the output of the exclusive OR calculation unit 201 is inputted to the exclusive OR calculation unit 203.

In addition, the output of the exclusive OR calculation unit 201 and the output of the selector 4 are inputted to the exclusive OR calculation unit 203, and the output of the exclusive OR calculation unit 203 is stored into the register 205.

Then, in a first cycle, the upper 9 bits in the input Z is selected at the selector 1, the output of the table S9F is selected at the selector 2, the output of the table S7F is selected at the selector 3, and the inputted expanded key is selected at the selector 4.

Namely, the upper 9 bits in the input Z is selected at the selector 1, and corresponding data is read out with the upper 9 bits in the input Z from the table S9F. Then, the output of the table S9F is selected at the selector 2. In addition, corresponding data is read out with the lower 7 bits of the input Z from the table S7F, and the output of the table S7F is selected at the selector 3. Furthermore, the outputs of the selectors 2 and 3 are exclusively ORed at the exclusive OR calculation unit 201. The expanded key KIij is selected at the selector 4, and the expanded key KIij and the output of the exclusive OR calculation unit 201 are exclusively ORed at the exclusive OR calculation unit 203, and the result is stored into the register 205.

In a second cycle after the first cycle, the lower 9 bits in the value stored in the register 205 is selected at the selector 1, data generated by arranging the upper 7 bits in the value stored in the register 205 in upper bit position, arranging 9-bit data in lower bit position and concatenating them is selected at the selector 2. The 9-bit data is generated by adding two "0" to the leftmost position of the upper 7 bits in the value stored in the register 205. A value generated by arranging the lower 9 bits in the output of the table S9F in lower bit position, arranging 7-bit "0" in upper bit position, and concatenating them is selected at the selector 3, and 16-bit "0" is selected at the selector 4.

Then, corresponding data is readout from the table S9F with the lower 9 bits in the value stored in the register 205. A value generated by concatenating upper 7-bit "0" with the lower 9 bits in the output of the table S9F is selected at the selector 3. At the selector 2, data generated by arranging the upper 7 bits in the value stored in the register 205 in upper bit position, arranging 9-bit data in lower bit position and concatenating them is selected. The 9-bit data is generated by adding two "0" to the leftmost position of the aforementioned 7 bits. Then, this selected data and a value generated by concatenating upper 7-bit "0" with the lower 9 bits in the output of the table S9F are inputted to the exclusive OR calculation unit 201 to obtain a result of the exclusive OR of those values. Furthermore, 16-bit "0" are selected at the selector 4. Therefore, the output of the exclusive OR calculation unit 201 is stored by the exclusive OR calculation unit 203 into the register 205 as it is. Then, the value stored in the register 205 is a final output R of the FI function.

Thus, even when the FI function is implemented with the hardware, it is possible to efficiently utilize the tables S9F and S7F.

Although the embodiments of the technique are explained above, this technique is not limited to those embodiments.

For example, in the above explanation, it was assumed that MISTY1 was implemented. However, the embodiments can be applied to other cryptographic method using the FI function, such as MISTY2. Furthermore, the embodiments can be applied to KASUMI cryptographic method using a similar FI function.

In addition, the hardware configuration depicted in FIG. 18 is a mere example, and another implementation using the tables S9F and S7F can be adopted.

Figure 19:
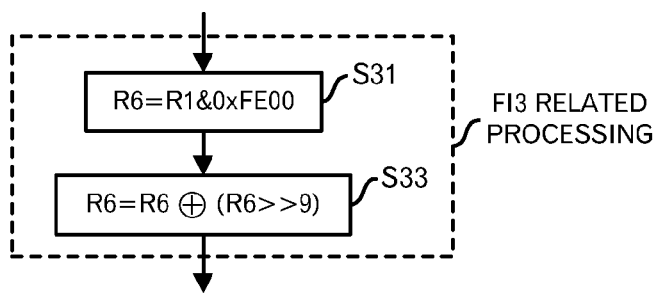
FIG. 19 is a diagram depicting another example of an FI3 related processing.

Furthermore, the FI3 related processing in FIG. 14 can be changed to a form as depicted in FIG. 19. Namely, the processor reads out (denoted "R1&0xFE00") the upper 7 bits in the register R1 without shifting the bit position, and stores the read value into the register R6 (step S31). Then, the processor calculates the exclusive OR of the value in the register R6 and a value generated by shifting the value stored in the register R6 to right by 9 bits, and stores the result into the register R6 (step S33). This is an equivalent processing to the FI3 related processing in FIG. 14. In addition, high-speed processing is realized.

Figure 20:
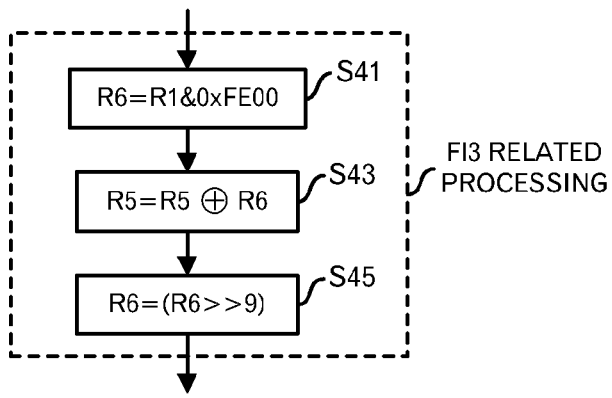
FIG. 20 is a diagram depicting another example of the FI3 related processing.

Similarly, the FI3 related processing may be changed to a processing as depicted in FIG. 20. Namely, the processor reads out the upper 7 bits in the register R1 without shifting the bit position, and stores the read value into the register R6 (step S41). Then, the processor calculates the exclusive OR of the value in the register R5 and the value in the register R6, and stores the result into the register R5 (step S43). Furthermore, the processor writes a value generated by shifting the value in the register R6 to the right by 9 bits into the register R6 (step S45). This processing is also an equivalent processing to the FI3 related processing in FIG. 14.

Figure 21:
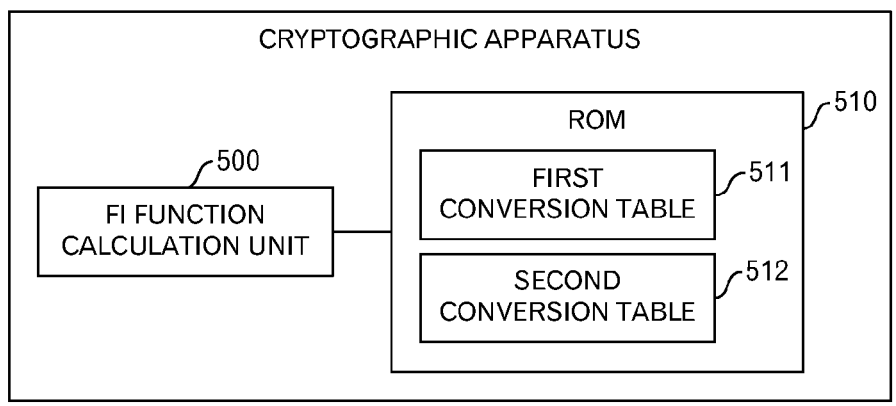
FIG. 21 is a functional block diagram of an cryptographic apparatus.

The embodiments are outlined as follows:

As one aspect of the embodiments, this is a cryptographic apparatus to carry out calculations according to an FI function including a first non-linear function S9 and a second non-linear function S7. Then, this cryptographic apparatus includes a read-only memory (FIG. 21: 510) recording (A-1) a first conversion table (FIG. 21: 511) including, for each first input X of 9*n bits (n is an integer equal to or larger than 1), a value obtained by exclusively ORing a first value and an first output from the first non-linear function S9 with respect to the first input X, wherein the first value is generated by shifting lower 7*n bits in the first output to left by 9*n bits; and (A-2) a second conversion table (FIG. 21: 512) including, for each second input Y of 7*n bits, a value obtained by exclusively ORing a second value and the second input Y, wherein the second value is generated by shifting a result of exclusive OR of the second input Y and a second output from the second non-linear function S7 with respect to the second input Y to left by 9*n bits; and (B) an FI function calculation unit (FIG. 21: 500) to carry out one calculation of an FI function by using, twice, the first conversion table recorded on the read-only memory and using, once, the second conversion table recorded on the read-only memory.

In cryptographic systems to carry out calculations according to the FI function, such as MISTY1 or MISTY2, by preparing the aforementioned first and second conversion tables, it is possible to reduce the size of ROM without using RAM.

In addition, the aforementioned FI function calculation unit may (b1) read out corresponding first data from the first conversion table by using, as the first input X, upper 9*n bits in a third input, (b2) readout corresponding second data from the second conversion table by using, as the second input Y, lower 7*n bits in the third input, (b3) generate third data by exclusively ORing an input expanded key and a result of exclusive OR of the first and second data, or generate third data by exclusively ORing the second data and a result of exclusive OR of the first data and an input expanded key, (b4) read out corresponding fourth data from the first conversion table by using, the first input X, lower 9*n bits in the third data, and generate fifth data by reading out lower 9*n bits in the fourth data, (b5) generate sixth data equivalent to a result of exclusive OR of the upper 7*n bits in the third data and a value generated by shifting the upper 7*n bits in the third data to left by 9*n bits, and (b6) calculate exclusive OR of the fifth and sixth data.

Even when the first and second conversion tables are introduced, the calculation cycles consumed by the entire FI function are not increased so much. The processing (b5) may be implemented by various equivalent implementation methods.

Furthermore, the cryptographic apparatus may have an expanded key generator and encryption processor. Then, the expanded key generator and the encryption processor may request the FI function calculation unit to carry out the calculation of the FI function, and receive a result of the calculation from the FI function calculation unit. For example, because the FI function is also used in the expanded key generation processing in MISTY1 and MISTY2, the first and second conversion tables are efficiently utilized.

In addition, the aforementioned FI function calculation unit may have first to fourth selectors, first and second exclusive OR calculation units and a register. In such a case, (d1) upper 9*n bits in the third input and lower 9*n bits in a value stored in the register may be inputted to the first selector, (d2) corresponding first data may be read out from the first conversion table by using, the first input X, an output of the first selector, (d3) corresponding second data may be read out from the second conversion table by using, the second input Y, lower 7*n bits in the third input, (d4) the first data and third data may be inputted to the second selector, wherein the third data is generated by arranging first upper 7*n bits in the value stored in the register in upper bit position, arranging 9*n-bit data in lower bit position and concatenating the first upper 7*n bits and the 9*n-bit data, and the 9*n-bit data is generated by adding 2*n-bit "0" to the leftmost position of the first upper 7*n bits, (d5) the second data and fourth data may be inputted to the third selector, wherein the fourth data is generated by concatenating upper 7*n-bit "0" with lower 9*n bits in the first data, (d6) the input expanded key and 16*n-bit "0" may be inputted to the fourth selector, (d7) the first exclusive OR calculation unit may calculate exclusive OR of an output of the second selector and an output of the third selector to generate fifth data, (d8) the second exclusive OR calculation unit may calculate exclusive OR of the fifth data and an output of the fourth selector to generate sixth data and store the sixth data into the register. Then, in a first cycle, the upper 9*n bits in the third input may be selected at the first selector, the first data may be selected at the second selector, the second data may be selected at the third selector and the input expanded key may be selected at the fourth selector. In addition, in a second cycle, the lower 9*n bits in the value stored in the register may be selected at the first selector, the third data may be selected at the second selector, the fourth data may be selected at the third selector, and the aforementioned 16*n-bit "0" may be selected at the fourth selector.

Even in case where the FI function is implemented by the hardware, it is possible to adopt the configuration using the first and second conversion tables.

Figure 22:
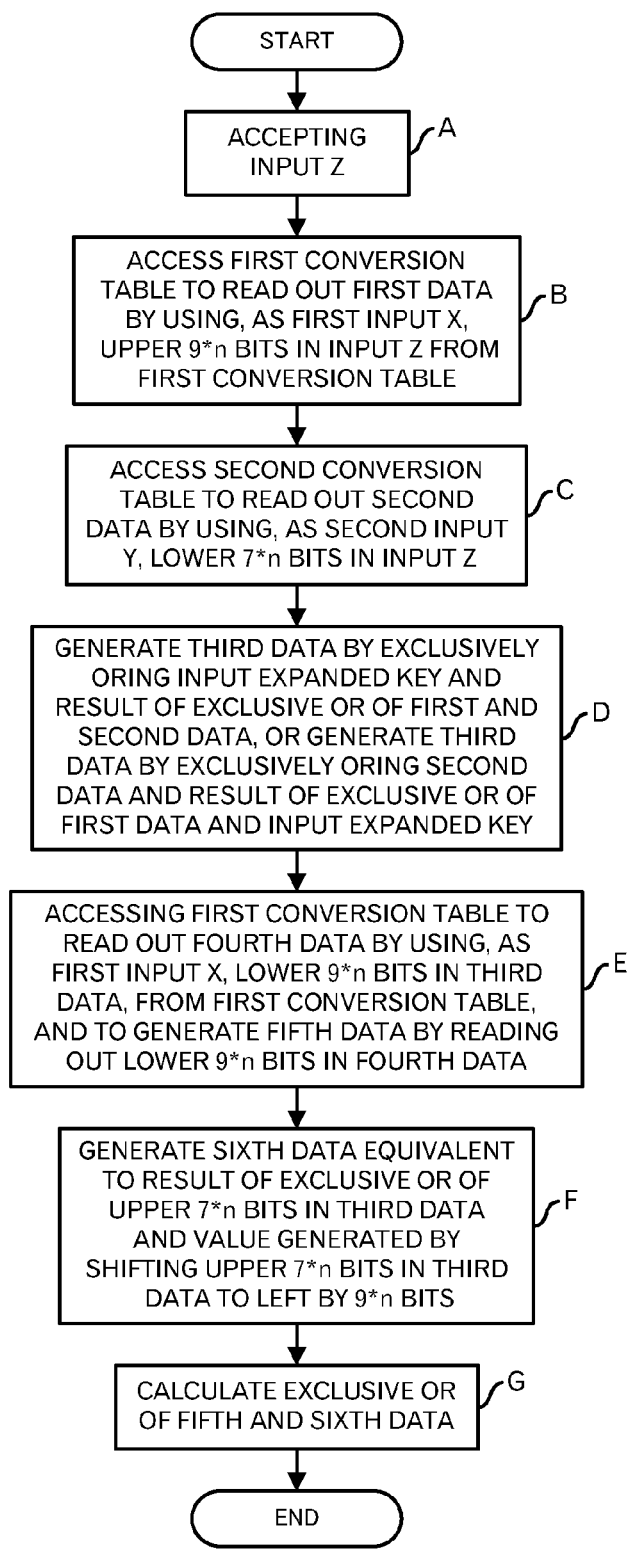
FIG. 22 is a diagram depicting a processing in the cryptographic apparatus.

Incidentally, a cryptographic method (FIG. 22) for executing calculation according an FI function including a first non-linear function S9 and a second non-linear function S7 includes (A) accepting an input Z; (B) accessing a first conversion table recorded on a read-only memory to read out first data, by using, as a first input X, upper 9*n bits in an input Z, from the first conversion table, wherein the read-only memory records (b1) the first conversion table including, for each first input X of 9*n bits (n is an integer equal to or larger than 1), a value obtained by exclusively ORing a first value and an first output from the first non-linear function S9 with respect to the first input X, wherein the first value is generated by shifting lower 7*n bits in the first output to left by 9*n bits, and (b2) a second conversion table including, for each second input Y of 7*n bits, a value obtained by exclusively ORing a second value and the second input Y, wherein the second value is generated by shifting a result of an exclusive OR of the second input Y and a second output from the second non-linear function S7 with respect to the second input Y to left by 9*n bits, and (C) accessing the second conversion table recorded on the read-only memory to read out second data by using, as the second input Y, lower 7*n bits in the input Z, from the second conversion table; (D) generating third data by exclusively ORing an input expanded key and a result of exclusive OR of the first and second data, or generate third data by exclusively ORing the second data and a result of exclusive OR of the first data and an input expanded key; (E) accessing the first conversion table recorded on the read-only memory to read out fourth data by using, as the first input X, lower 9*n bits in the third data, from the first conversion table, and to generate fifth data by reading out lower 9*n bits in the fourth data; (F) generating sixth data equivalent to a result of exclusive OR of the upper 7*n bits in the third data and a value generated by shifting the upper 7*n bits in the third data to left by 9*n bits, and (G) calculate exclusive OR of the fifth and sixth data.

Incidentally, it is possible to create a program causing a computer to execute the aforementioned processing, and such a program is stored in a computer readable storage medium or storage device such as a flexible disk, CD-ROM, DVD-ROM, magneto-optic disk, a semiconductor memory, and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention. In addition, the intermediate processing result is temporarily stored in a storage device such as a main memory or the like.

What is claimed is:

1. A cryptographic apparatus to carry out calculations according to an FI function including a first non-linear function S9 and a second non-linear function S7, comprising:
    a read-only memory recording a first conversion table including, for each first input X of 9*n bits (n is an integer equal to or larger than 1), a value obtained by exclusively ORing a first value and an first output from said first non-linear function S9 with respect to a first input X, wherein said first value is generated by shifting lower 7*n bits in said first output to left by 9*n bits; and a second conversion table including, for each second input Y of 7*n bits, a value obtained by exclusively ORing a second value and said second input Y, wherein said second value is generated by shifting a result of an exclusive OR of said second input Y and a second output from said second non-linear function S7 with respect to a second input Y to left by 9*n bits; and
    an FI function calculation unit to carry out one calculation of an FI function by using, twice, said first conversion table recorded on said read-only memory and using, once, said second conversion table recorded on said read-only memory.

2. The cryptographic apparatus as set forth in claim 1, wherein said FI function calculation unit reads out first data from said first conversion table by using, as said first input X, upper 9*n bits in a third input,
    reads out second data from said second conversion table by using, as said second input Y, lower 7*n bits in said third input,
    generates third data by exclusively ORing an input expanded key and a result of exclusive OR of said first and second data, or generates third data by exclusively ORing said second data and a result of exclusive OR of said first data and an input expanded key,
    reads out fourth data from said first conversion table by using, as said first input X, lower 9*n bits in the third data, and generates fifth data by reading out lower 9*n bits in said fourth data,
    generates sixth data equivalent to a result of exclusive OR of upper 7*n bits in said third data and a value generated by shifting said upper 7*n bits in said third data to left by 9*n bits, and
    calculates exclusive OR of said fifth and sixth data.

3. The cryptographic apparatus as set forth in claim 1, further comprising:
    an expanded key generator; and
    an encryption processor, and
    wherein said expanded key generator and said encryption processor request said FI function calculation unit to carry out said calculation of said FI function, and receives a calculation result from said FI function calculation unit.

4. The cryptographic apparatus as set forth in claim 1, wherein said FI function calculation unit comprises first to fourth selectors, first and second exclusive OR calculation units and a register,
    wherein upper 9*n bits in said third input and lower 9*n bits in a value stored in said register are inputted to said first selector,
    first data is read out from said first conversion table by using, as said first input X, an output of the first selector, second data is read out from said second conversion table by using, as said second input Y, lower 7*n bits in said third input,
    said first data and third data are inputted to said second selector, wherein said third data is generated by arranging first upper 7*n bits in said value stored in said register in upper bit position, arranging 9*n-bit data in lower bit position and concatenating said first upper 7*n bits and said 9*n-bit data, and said 9*n-bit data is generated by adding 2*n-bit "0" to leftmost position of said first upper 7*n bits,
    said second data and fourth data are inputted to said third selector, wherein said fourth data is generated by concatenating upper 7*n-bit "0" with lower 9*n bits in said first data,
    an input expanded key and 16*n-bit "0" are inputted to said fourth selector,
    said first exclusive OR calculation unit calculates exclusive OR of an output of said second selector and an output of said third selector to generate fifth data, and
    said second exclusive OR calculation unit calculates exclusive OR of said fifth data and an output of said fourth selector to generate sixth data and store said sixth data into said register, and
    wherein, in a first cycle, said upper 9*n bits in said third input is selected at said first selector, said first data is selected at said second selector, said second data is selected at said third selector and said input expanded key is selected at said fourth selector, and
    in a second cycle, said lower 9*n bits in said value stored in said register is selected at said first selector, said third data is selected at said second selector, said fourth data is selected at said third selector, and said 16\*n-bit "0" is selected at said fourth selector.

5. A non-transitory computer-readable storage medium storing a cryptographic program to execute a process according an FI function including a first non-linear function S9 and a second non-linear function S7, said process comprising:
    accepting an input Z;
    accessing a first conversion table recorded on a read-only memory to read out first data, by using, as a first input X, upper 9*n bits in an input Z, from said first conversion table, wherein said read-only memory records (a) said first conversion table including, for each first input X of 9*n bits (n is an integer equal to or larger than 1), a value obtained by exclusively ORing a first value and an first output from said first non-linear function S9 with respect to said first input X, wherein said first value is generated by shifting lower 7*n bits in said first output to left by 9*n bits, and (b) a second conversion table including, for each second input Y of 7*n bits, a value obtained by exclusively ORing a second value and said second input Y, wherein said second value is generated by shifting a result of an exclusive OR of said second input Y and a second output from said second non-linear function S7 with respect to said second input Y to left by 9*n bits;
    accessing said second conversion table recorded on said read-only memory to read out second data, by using, as said second input Y, lower 7*n bits in said input Z, from said second conversion table;
    generating third data by exclusively ORing an input expanded key and a result of exclusive OR of said first and second data, or generating third data by exclusively ORing said second data and a result of exclusive OR of said first data and an input expanded key;
    accessing said first conversion table recoded on said read-only memory to read out fourth data, by using, as said first input X, lower 9*n bits in said third data, from said first conversion table, and to generate fifth data by reading out lower 9*n bits in said fourth data;

generating sixth data equivalent to a result of exclusive OR of said upper 7*n bits in said third data and a value generated by shifting the upper 7*n bits in said third data to left by 9*n bits; and calculating exclusive OR of said fifth and sixth data.

6. A cryptographic method for executing a process according an FI function including a first non-linear function S9 and a second non linear function S7, comprising:

accepting an input Z;

accessing a first conversion table recorded on a read-only memory to read out first data, by using, as a first input X, upper 9*n bits in an input Z, from said first conversion table, wherein said read-only memory records (a) said first conversion table including, for each first input X of 9*n bits (n is an integer equal to or larger than 1), a value obtained by exclusively ORing a first value and an first output from said first non-linear function S9 with respect to said first input X, wherein said first value is generated by shifting lower 7*n bits in said first output to left by 9*n bits, and (b) a second conversion table including, for each second input Y of 7*n bits, a value obtained by exclusively ORing a second value and said second input Y, wherein said second value is generated by shifting a result of an exclusive OR of said second input Y and a second output from said second non-linear function S7 with respect to said second input Y to left by 9*n bits;

accessing said second conversion table recorded on said read-only memory to read out second data, by using, as said second input Y, lower 7*n bits in said input Z, from said second conversion table;

generating third data by exclusively ORing an input expanded key and a result of exclusive OR of said first and second data, or generating third data by exclusively ORing said second data and a result of exclusive OR of said first data and an input expanded key;

accessing said first conversion table recoded on said read-only memory to read out fourth data, by using, as said first input X, lower 9*n bits in said third data, from said first conversion table, and to generate fifth data by reading out lower 9*n bits in said fourth data;

generating sixth data equivalent to a result of exclusive OR of said upper 7*n bits in said third data and a value generated by shifting the upper 7*n bits in said third data to left by 9*n bits; and calculating exclusive OR of said fifth and sixth data.

7. A read-only memory storing data and a program, wherein said data comprises:

a first conversion table including, for each first input X of 9*n bits (n is an integer equal to or larger than 1), a value obtained by exclusively ORing a first value and an first output from said first non-linear function S9 with respect to a first input X, wherein said first value is generated by shifting lower 7*n bits in said first output to left by 9*n bits; and a second conversion table including, for each second input Y of 7*n bits, a value obtained by exclusively ORing a second value and said second input Y, wherein said second value is generated by shifting a result of an exclusive OR of said second input Y and a second output from said second non-linear function S7 with respect to a second input Y to left by 9*n bits; and wherein said program comprising:

a cryptographic program for causing a processor to execute a process according an FI function including a first non-linear function S9 and a second non linear function S7, wherein said process comprises:

accepting an input Z;

accessing said first conversion table recorded on said read-only memory to read out first data by using, as a first input X, upper 9*n bits in an input Z, from said first conversion table;

accessing said second conversion table recorded on said read-only memory to read out second data, by using, as said second input Y, lower 7*n bits in said input Z, from said second conversion table;

generating third data by exclusively ORing an input expanded key and a result of exclusive OR of said first and second data, or generating third data by exclusively ORing said second data and a result of exclusive OR of said first data and an input expanded key;

accessing said first conversion table recoded on said read-only memory to read out fourth data by using, as said first input X, lower 9*n bits in said third data, from said first conversion table, and to generate fifth data by reading out lower 9*n bits in said fourth data;

generating sixth data equivalent to a result of exclusive OR of said upper 7*n bits in said third data and a value generated by shifting the upper 7*n bits in said third data to left by 9*n bits; and calculating exclusive OR of said fifth and sixth data.

8. A processor having said read-only memory as set forth in claim 7.

* * * * *